C. A. NORALL.
AUTOMATIC FUEL SAVER.
APPLICATION FILED SEPT. 15, 1921.
1,432,610.  
Patented Oct. 17, 1922.
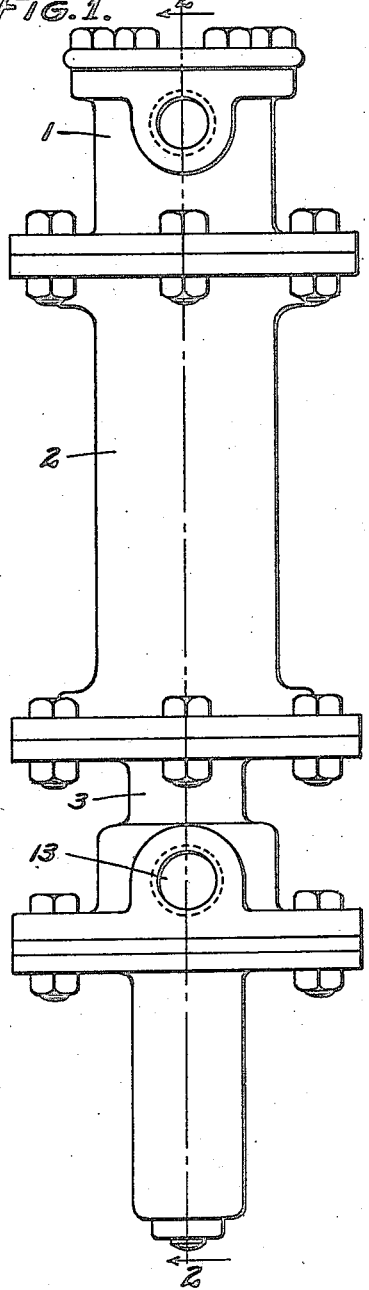
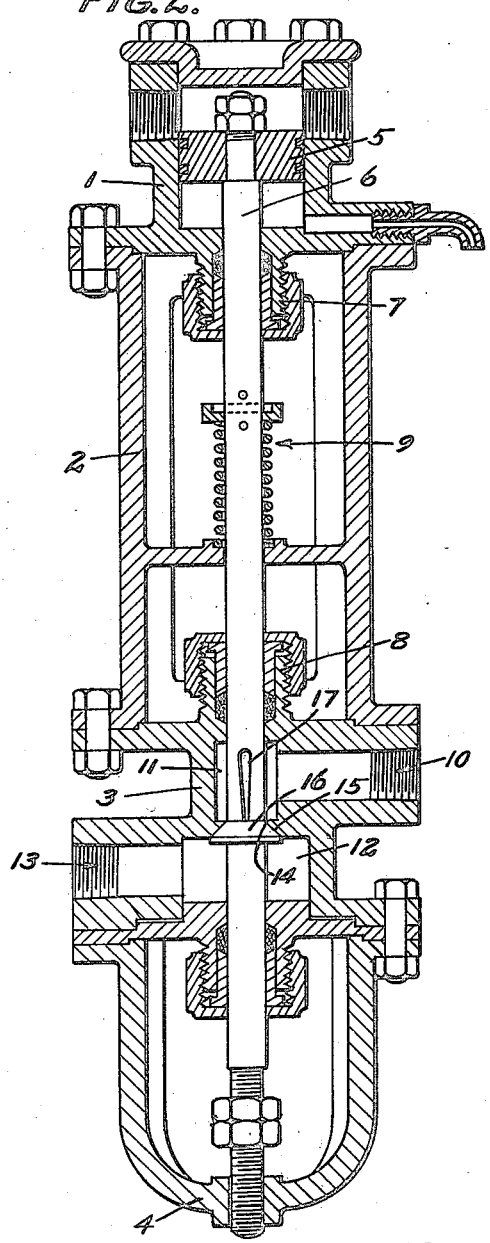
INVENTOR  
CARL A. NORALL  
BY Herman Miller  
ATTORNEY.

Patented Oct. 17, 1922.

1,432,610

UNITED STATES PATENT OFFICE.

CARL A. NORALL, OF LOS ANGELES, CALIFORNIA.

AUTOMATIC FUEL SAVER.

Application filed September 15, 1921. Serial No. 500,832.

*To all whom it may concern:*

Be it known that I, CARL A. NORALL, a citizen of the United States, residing at Los Angeles, in the county of Los Angeles and State of California, have invented new and useful Improvements in Automatic Fuel Savers, of which the following is a specification.

This invention relates to an automatic fuel saver and has for its object to provide certain improvements over my Patent No. 1,353,664, the general structure and objects of which are common to my present application.

More specifically, the improvement in my present device is to provide means for allowing a finer degree of adjustment and regulation of the fuel oil flowing through my device.

The invention will be readily understood from the following description of the accompanying drawing in which:

Fig. 1 is a side elevation of my improved fuel saver.

Fig. 2 is a transverse section taken on line 2—2 of Fig. 1.

My present invention, like my patented device, comprises substantially a steam cylinder 1 supported upon the upper end of a spacing frame 2, having a valve casing 3 fastened to the lower end of the frame 2 and a valve stem guide 4 is fastened to the lower end of the casing 3. Positioned in the steam chamber 1 is the usual piston 5 mounted upon the piston rod 6 projecting downwardly from a stuffing gland 7 and inwardly to the valve casing through a second gland 8. The usual spring and collar construction 9 is mounted upon the piston rod for returning the piston to its upper position.

As the operation of this device, in connection with the fuel system, is described in my forementioned patent the specific means for regulating the fuel through the valve casing will only be described.

This means comprises substantially a valve casing 3 having an inlet 10 leading into an annular chamber 11 surrounding the piston rod and when the device is in operation, the chamber 11 communicates with a second chamber 12 which in turn has communication with the outlet 13. The piston rod 6 passes through an aperture 14 formed by the valve seat portion 15 and the piston rod closely fits within the aperture. A valve 16 is mounted upon the piston rod and adapted to close communication between the chambers 12 and 11 when the piston is in its uppermost position.

To provide communication between the chambers 11 and 12 when the piston is in a lower position a transverse slot 17 is longitudinally tapered and it will be seen that as the piston is moved downwardly the slot will gradually enlarge the passage way from the chamber 11 to the chamber 12 as the fuel will thus be allowed to flow into the portion of the slot remaining in the chamber 12, down past the aperture 14 and out through the portion of the slot positioned within the chamber 12 and thus a very fine degree of adjustment is obtained.

The rod projects downwardly through a packing gland 18 from the valve casing 3 and has adjusting nuts 19 on the lower end of the rod for limiting the motion of the piston.

Various changes may be made in the details of construction by those skilled in the art without departing from the spirit of my invention as set forth in the appended claims.

What is claimed is:

1. An automatic fuel regulator comprising a casing having fuel inlet and outlet chambers, an aperture between the chambers, a valve seat formed in the wall of said aperture, a rod having slidable contact with the aperture, a by-pass in said rod adapted to allow communication between the chambers when the rod is shifted so that a portion of the by-pass is within each of the chambers, and a valve arranged on the rod to repose in said seat and close said aperture when the by-pass is in non-communicative position with respect to both of the chambers.

2. An automatic fuel regulator comprising a valve casing having fuel inlet and outlet chambers, an aperture between said chambers, a rod having slidable contact with said aperture, a longitudinally tapered transverse slot in said rod adapted to allow communication between said chambers when said rod is shifted so that a portion of said slot is within each of said chambers, and a valve arranged on the rod to close said aperture when the slot is in non-communicative position with respect to both of the chambers.

In testimony whereof I have signed my name to this specification.

CARL A. NORALL.